(12) United States Patent
Lin et al.

(10) Patent No.: US 9,462,756 B2
(45) Date of Patent: Oct. 11, 2016

(54) MODULAR DEVICE FOR RAISING SEEDLING

(71) Applicant: Ming-Tsun Lin, Hsinchu County (TW)

(72) Inventors: Ming-Tsun Lin, Hsinchu County (TW); Chia-Ching Lin, Hsinchu County (TW); Ming-Chang Lee, Hsinchu County (TW); Chien-Yi Hsiao, Hsinchu County (TW); Jen-Liang Chou, Hsinchu County (TW); Cheng-Hung Yang, Hsinchu County (TW)

(73) Assignee: Ming-Tsun Lin, Zhubei, Hsinchu County (TW)

( * ) Notice: Subject to any disclaimer, the term of this patent is extended or adjusted under 35 U.S.C. 154(b) by 83 days.

(21) Appl. No.: 14/084,686

(22) Filed: Nov. 20, 2013

(65) Prior Publication Data

US 2015/0135592 A1    May 21, 2015

(51) Int. Cl.
*A01G 9/02* (2006.01)
*A01G 9/10* (2006.01)

(52) U.S. Cl.
CPC .................... *A01G 9/104* (2013.01)

(58) Field of Classification Search
CPC .......... A01G 9/00; A01G 9/02; A01G 9/027; A01G 9/028; A01G 9/10; A01G 9/1026; A01G 9/104; A01G 9/1066; A47F 5/0846; A47H 27/00; A47G 7/044
USPC .............. 47/86, 79, 82, 39, 65.5, 66.1, 66.5, 47/66.6, 66.7, 73, 83; 211/94.01, 94.02, 211/88.03
See application file for complete search history.

(56) References Cited

U.S. PATENT DOCUMENTS

| | | | | |
|---|---|---|---|---|
| 3,047,158 A | * | 7/1962 | Scholl | 211/85.17 |
| 3,698,565 A | * | 10/1972 | Weber | 211/87.01 |
| 4,050,188 A | * | 9/1977 | van Wingerden | 47/85 |
| 4,896,456 A | * | 1/1990 | Grant | 47/67 |
| 5,131,185 A | * | 7/1992 | Wingerden | A01G 9/086 47/73 |
| 7,686,172 B2 | * | 3/2010 | Wisnoski et al. | 211/94.01 |
| 8,950,112 B2 | * | 2/2015 | dos Santos | 47/82 |
| 2011/0016784 A1 | * | 1/2011 | Taber | A01G 9/025 47/79 |
| 2011/0036008 A1 | * | 2/2011 | Hashimoto et al. | 47/82 |
| 2011/0113685 A1 | * | 5/2011 | Chang | 47/39 |
| 2011/0192081 A1 | * | 8/2011 | MacKenzie | A01G 9/025 47/66.6 |
| 2011/0252704 A1 | * | 10/2011 | Cho | 47/66.6 |
| 2013/0152467 A1 | * | 6/2013 | Chang | 47/82 |
| 2014/0075840 A1 | * | 3/2014 | Gosling et al. | 47/81 |

* cited by examiner

*Primary Examiner* — Trinh Nguyen
(74) *Attorney, Agent, or Firm* — Jackson IPG PLLC; Demian K. Jackson

(57) ABSTRACT

The present invention discloses a modular device for raising seedling that comprises at least two individual containers to receive a culture medium and a seedling, and at least a coupling member. Each of the individual containers is provided with at least a pair of the coupling bumps arranged on two opposing positions respectively on both lateral edges of the individual container, and is protruded at a predetermined height from a backside of the individual container. Each of the coupling members is provided with a mating groove which is arranged in extending around its longitudinal shape so as to form a serial connection of the individual containers by means of mating the coupling bump with the mating groove within the same coupling member between two adjacent individual containers.

10 Claims, 12 Drawing Sheets

MODULAR DEVICE FOR RAISING SEEDLING

BACKGROUND OF THE INVENTION

1. Technical Field

The invention relates to a device for raising seedling, and more particularly to a modular device for raising seedling according to the actual requirement of seedling growth, so as to timely adjust the number and spacing interval of seedling.

2. Description of Related Art

The modern agriculture leading to reduction of time consuming and cost spending of cultivating plant seed for ensuring the seedling quality and yield rate has initiated a common practice in taking agricultural crops with certain growth level of seedling into cultivation for further improving the survival rate of the agricultural crops. Plug seedlings is an agricultural technique which provides the advantages of seed saving, uniform growth for seedling, reduction for pest and disease, higher survival rate for transplanted plaints, and earlier harvesting so that seedling automation can be developed smoothly.

Comparatively, whether the structural design of a tray used in plug seedlings meets the actual requirement or not is of direct impact on the production and cost of plant seedling. A conventional tray is provided by scribing a plurality of grid cells in a predetermined spacing on a tray body, and thus each of the grid cells has a predetermined width and relative indent depth within the tray body.

During operation, firstly, the seedling ready for cultivation is transplanted into a soft nursery pot loaded with the culture medium such as, for example, culture soil, mineral wool, vermiculite, coir or clay pellets. Secondly, the soft nursery pot with the seedling and culture medium is placed in grid cells of the tray for performing cultivation. Thirdly, the soft nursery pot cannot be taken out of the grid cells of the tray until the seedling in the grid cells has grown to a predetermined level, and carefully stripping off the outer layer of culture medium and then performing the subsequent process.

In order to obtain higher cultivation rate of seedling, the traditional approach to nursery trays arranges the grid cells as a matrix layout, and sets up a spacing interval among the grid cells based on a growth scale to the extent that seedling may grow for being transplanted such that the application of nursery trays is limited. For example, users cannot adjust the number or spacing interval of grid cells dependent on the true cultivation scale during an initial period of seed germination due to the larger spacing interval that leads to the larger space occupied by the whole nursery trays and inconvenient irrigations as well. On the other hand, the spacing interval of grid cells is so small that it restrains plants from growth when the cultivated seedling grows to a predetermined scale while it is without being transplanted.

SUMMARY OF THE INVENTION

Therefore, it is a primary objective of the invention to propose a modular device for raising seedling according to the true requirement of seedling growth so as to timely adjust the number and spacing interval of seedling.

For the afore-mentioned purpose, the invention discloses a modular device for raising seedling that comprises at least two individual containers and at least a coupling member. Each of the individual containers has a first chamber recessed downwardly from a top side of the individual container so as to allow the first chamber to receive a culture medium and a seedling. The first chamber has a bottom that is provided with an outlet disposed on the bottom of the first chamber. Each of the individual containers is provided with at least a pair of coupling bumps that are arranged on two opposing positions respectively on both lateral edges of the individual container, and each of the coupling bumps is protruded at a predetermined height from a backside of the individual container. At least a coupling member, formed in a longitudinal shape with a predetermined length, is provided with a mating groove arranged in extending around the longitudinal shape where the mating groove has a gap between two inner longitudinal edges of the coupling member, so as to allow the coupling bump to mate with the gap. The mating groove has a distance between its two inner longitudinal edges such that the distance is greater than at least twice the width of the coupling bump.

For the afore-mentioned features, the invention discloses a modular device for raising seedling that constitutes a serial connection of the individual containers by means of mating the coupling bump with the mating groove within the same coupling member between two adjacent individual containers. Therefore, the predetermined number of the individual containers for assembling can be implemented based on the actual scale of cultivation. During operation, each individual container can be loaded with the culture medium and space where seedling grows such that the seedling can grow in its own independent individual container. Particularly, the mating groove of the coupling member can allow the coupling bump of the individual container to perform a slide tour after the serial connection of the adjacent individual containers is completed, and in case of necessity, the distance between the adjacent individual containers can be adjustable by means of allowing to pull apart or draw together relative to one another, so as to achieve the purpose of timely controlling the growth space of ground parts of plants based on the growth requirement of the cultivated plants.

Concretely speaking, the following functions and effects can be obtained according to the modular device for raising seedling disclosed in the present invention:

1. The predetermined number of individual containers for assembly can be implemented based on the actual scale of cultivation.
2. The number of individual containers can be timely increased or decreased.
3. The distance between the adjacent individual containers can be adjustable so as to achieve the purpose of timely controlling the growth space of ground parts of plants based on the growth requirement of the cultivated plants.
4. The individual container can obtain secure, reliable and shielding effects substantially under the functioning of the housing.
5. The predetermined number of individual containers can be assembled or integrated as a moveable and/or manageable module substantially under the functioning of the first frame or the second frame.

BRIEF DESCRIPTION OF THE DRAWINGS

The structure and the technical means adopted by the present invention to achieve the above and other objectives can be best understood by referring to the following detailed description of the preferred embodiments and the accompanying diagrams.

DETAILED DESCRIPTION OF THE INVENTION

Figure 1:
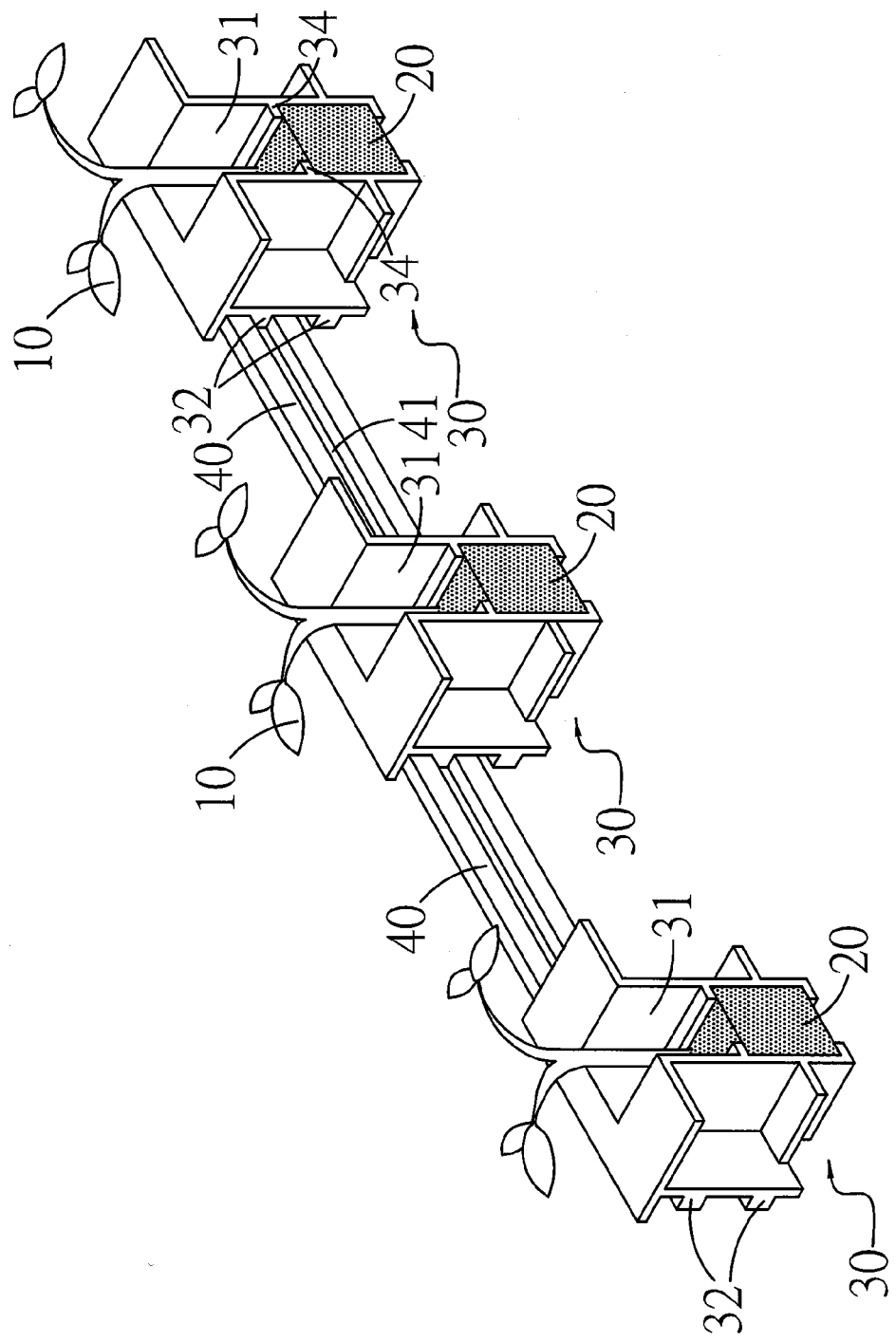
FIG. 1 is a schematic view that shows a modular device for raising seedling according to a first preferred embodiment of the invention.
Figure 2:
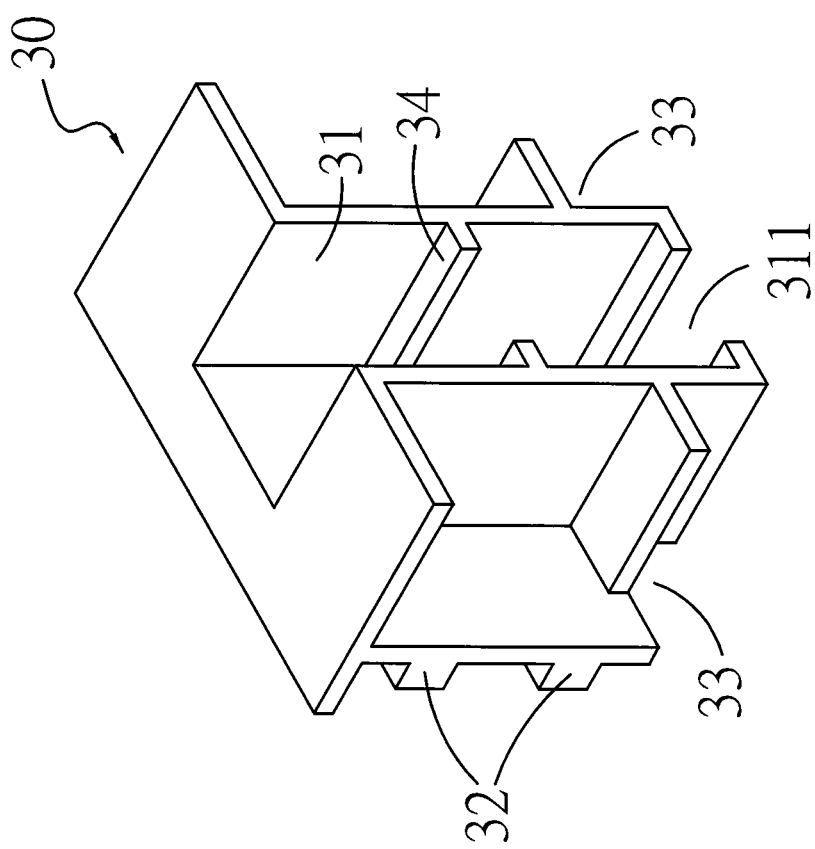
FIG. 2 is a schematic 3D view that shows a front side structure of an individual container according to the first preferred embodiment of the invention.
Figure 3:
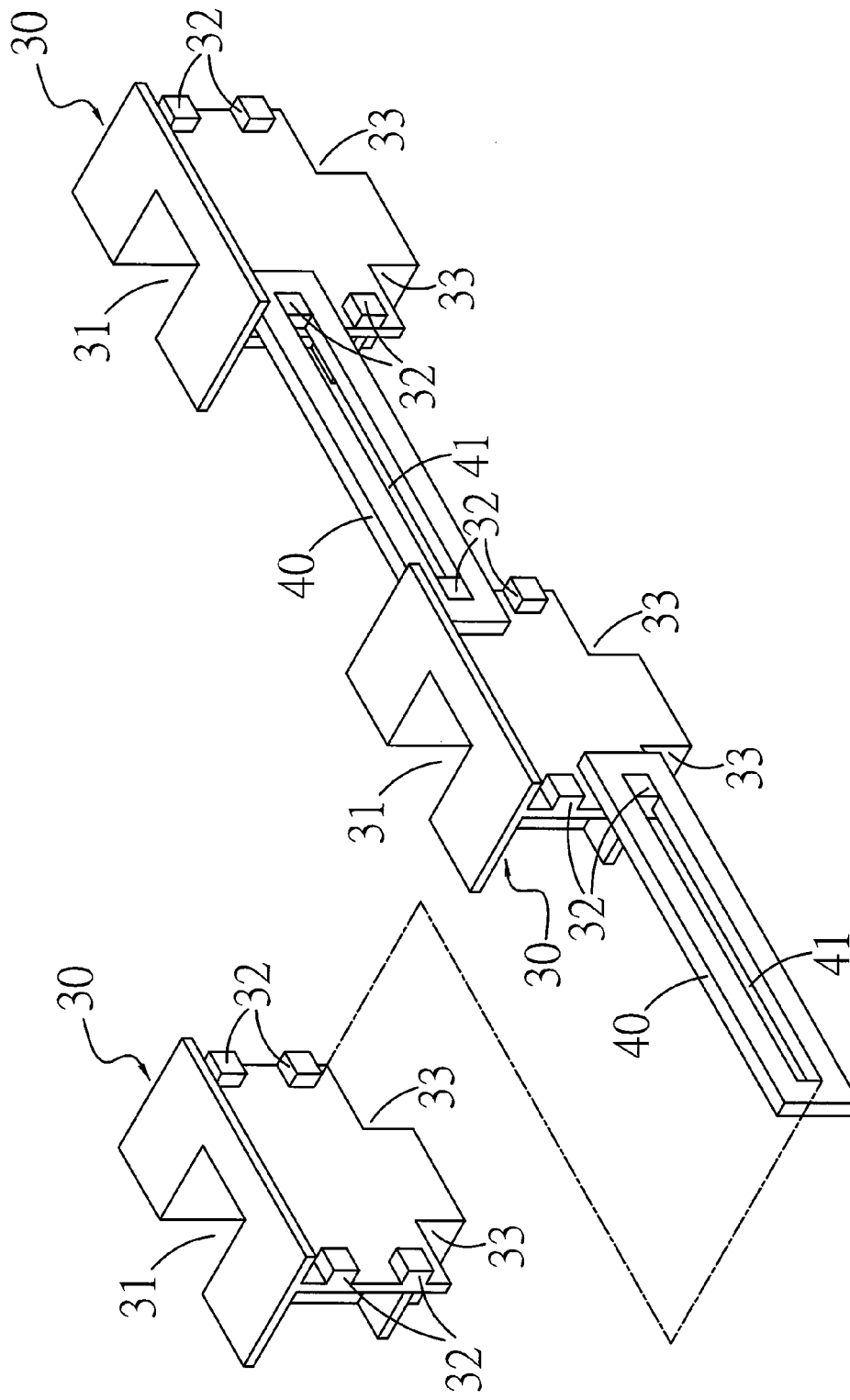
FIG. 3 is a schematic view that shows a back-side structure of the individual container and a serial connection between the adjacent individual containers according to the first preferred embodiment of the invention.

The present invention proposes a modular device for raising seedling based on the actual scale of cultivation and the actual growth requirement of the cultivated plants so as to timely adjust the number and spacing interval of seedling. Refer to FIG. 1, which is a schematic view that shows a modular device for raising seedling according to a first preferred embodiment of the invention. FIG. 2 is a schematic 3D view that shows a front side structure of an individual container according to the first preferred embodiment of the invention. FIG. 3 is a schematic view that shows a back-side structure of the individual container and a serial connection between the adjacent individual containers according to the first preferred embodiment of the invention. The invention discloses the modular device for raising seedling that basically comprises at least two individual containers 30 and at least a coupling member 40.

Each of the individual containers 30 has a first chamber 31 recessed downwardly from a top side of the individual container 30 so as to allow the first chamber 31 to receive a culture medium 20 and a seedling 10. The first chamber 31 has a bottom that is provided with an outlet 311 disposed on the bottom of the first chamber 31. Each of the individual containers 30 is provided with at least a pair of coupling bumps 32 that are arranged on two opposing positions respectively on both lateral edges of the individual container 30, and each of the coupling bumps 32 is protruded at a predetermined height from a backside of the individual container 30.

At least a coupling member 40, formed in a longitudinal shape with a predetermined length, is provided with a mating groove 41 arranged in extending around the longitudinal shape. The mating groove 41 has a gap between two inner longitudinal edges of the coupling member, so as to allow the coupling bump 32 to mate with the gap. Besides, the mating groove 41 has a distance between its two inner longitudinal edges such that the distance is greater than at least twice the width of the coupling bump 32. Therefore, the mating groove 41 of the coupling member 40 can allow the coupling bump 32 of the individual container 30 to perform a slide tour after the serial connection of the adjacent individual containers 30 is completed by means of the coupling member 40, and thus the spacing distance or interval between the adjacent individual containers 30 can be adjustable.

Basically, the modular device modular device for raising seedling in the present invention can constitute the serial connection of the individual containers 30 by means of mating the coupling bump 32 with the mating groove 41 within the same coupling member 40 between two adjacent individual containers 30. The predetermined number of individual containers 30 for assembly can be implemented based on the actual scale of cultivation, or the number of individual containers can be timely increased or decreased. During operation, each individual container 30 can be loaded with the culture medium 20 and seedling 10 such that a growth space is created to ensure that the seedling 10 can grow in its own independent individual container 30.

Particularly, the mating groove 41 of the coupling member 40 can allow the coupling bump 32 of the individual container 30 to perform a slide tour after the serial connection of the adjacent individual containers 30 is completed by means of the coupling member 40, and in case of necessity, the distance between the adjacent individual containers 30 can be adjustable by means of allowing to pull apart (shown in FIG. 1) or to draw together (shown in FIG. 4) relative to one another, so as to achieve the purpose of timely controlling the growth space of ground parts of plants (e.g. seedling 10) based on the growth requirement of the cultivated plants (e.g. seedling 10).

Figure 4:
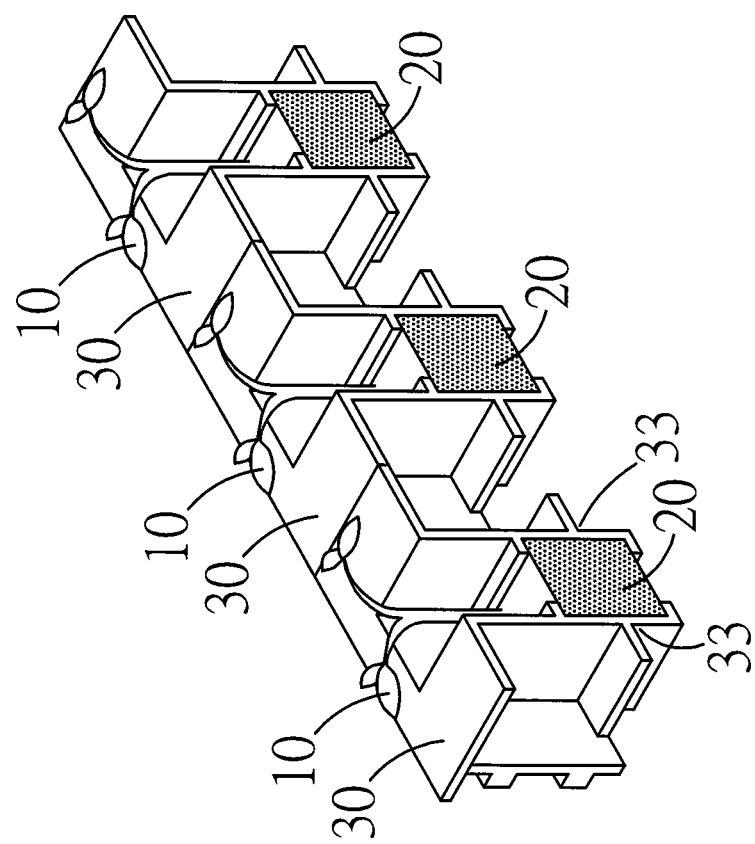
FIG. 4 is a schematic view that shows a mated structure of the individual containers according to the first preferred embodiment of the invention.

During practicing, each of individual containers 30 is provided with two coupling bumps 32 on two opposing positions respectively on both lateral edges of the individual container 30 that are protruded at a predetermined height from a backside of the individual container 30, and a distance formed between the two coupling bumps disposed on the same lateral edge can allow an interleaving movement of two coupling members 40 such that the two adjacent individual containers 30 can be drawn together relative to one another in an inter-abutting situation, shown in FIG. 4, and thus the whole modular device for raising seedling can be shrunk to its minimum size.

Figure 5:
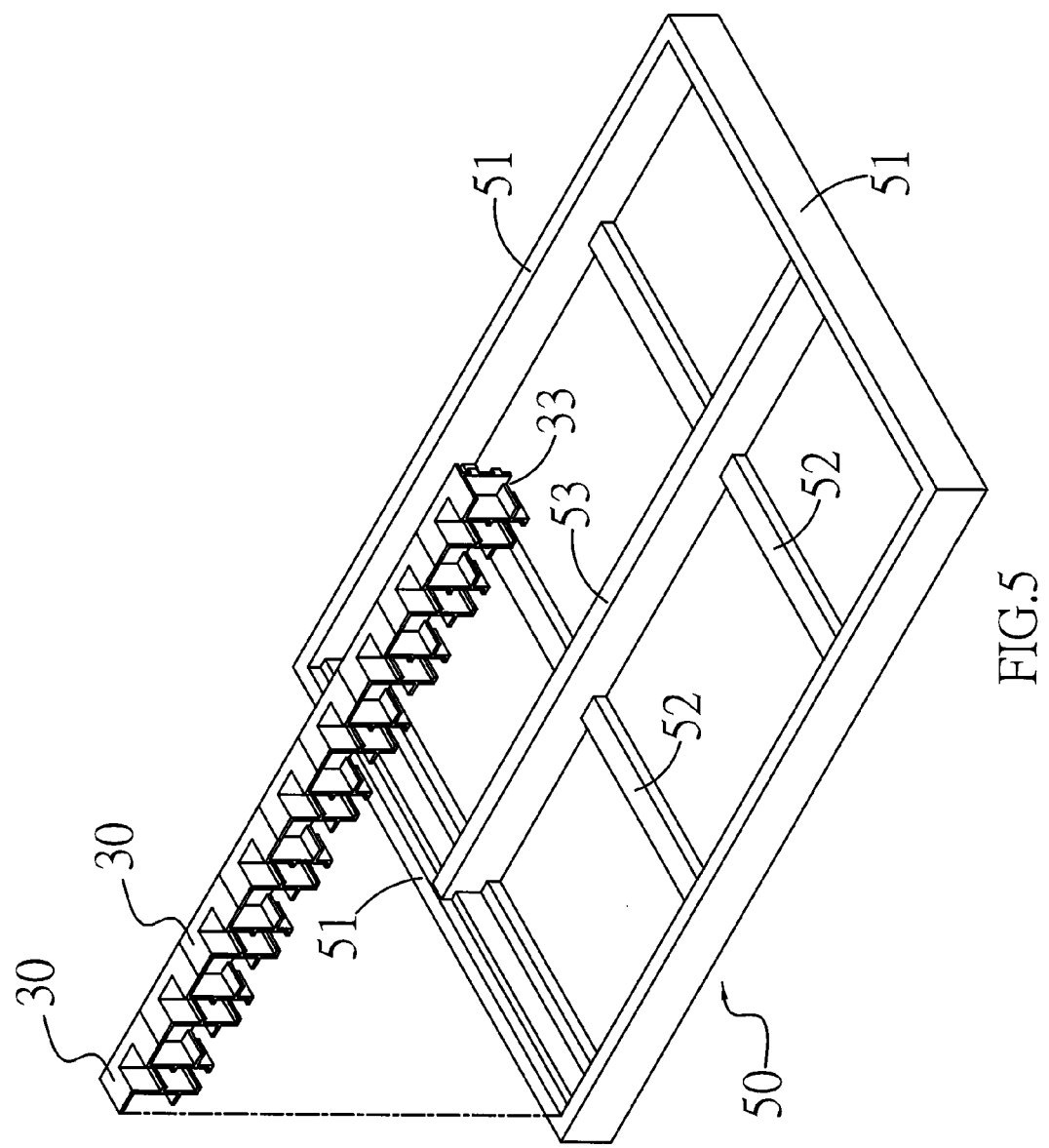
FIG. 5 is a schematic view that shows a modular device for raising seedling according to a second preferred embodiment of the invention.

Moreover, FIG. 5 shows a modular device for raising seedling according to the invention that further comprises a first frame 50 which is a rectangular frame formed of four surrounding sidebars 51. A gap between one pair of the two opposing sidebars 51 is provided to receive several of the individual containers 30 linked by several of the coupling member 40, and another pair of the two opposing sidebars are linked with at least a rib 52. The afore-mentioned structure provides each of the individual containers 30 with a concave 33 on each of two sides of its bottom respectively so as to allow the sidebar and rib to extend through the concave, refer to FIG. 4. Several of the individual containers 30 linked by several of the coupling member 40 can obtain a secured support and/or fixing effect under the functioning of the first frame 50, and further the predetermined number of individual containers 30 can be integrated as a moveable and/or manageable module.

Refer back to FIG. 5, the modular device for raising seedling according to the invention further comprises a first frame 50 which is a rectangular frame formed of the four surrounding sidebars 51. The gap between one pair of the two opposing sidebars 51 is provided to receive several of the individual containers 30 linked by several of the coupling member 40, and another pair of the two opposing sidebars are linked with at least a rib 52. The aforementioned structure provides each of the individual containers 30 with the concave 33 on each of two sides of its bottom respectively so as to allow the sidebar and rib to extend through the concave. A partition bar 53 is provided at the first frame 50 under the afore-mentioned structure, and the partition bar 53 is configured to vertically connect with all ribs 52 and the two opposing sidebars 51 as well. Hence, the combinational effects can be obtained by means of a serial connection of several individual containers 30 with several coupling member 40 together with the partition bar 53 for partitioning within the same first frame 50.

Figure 6:
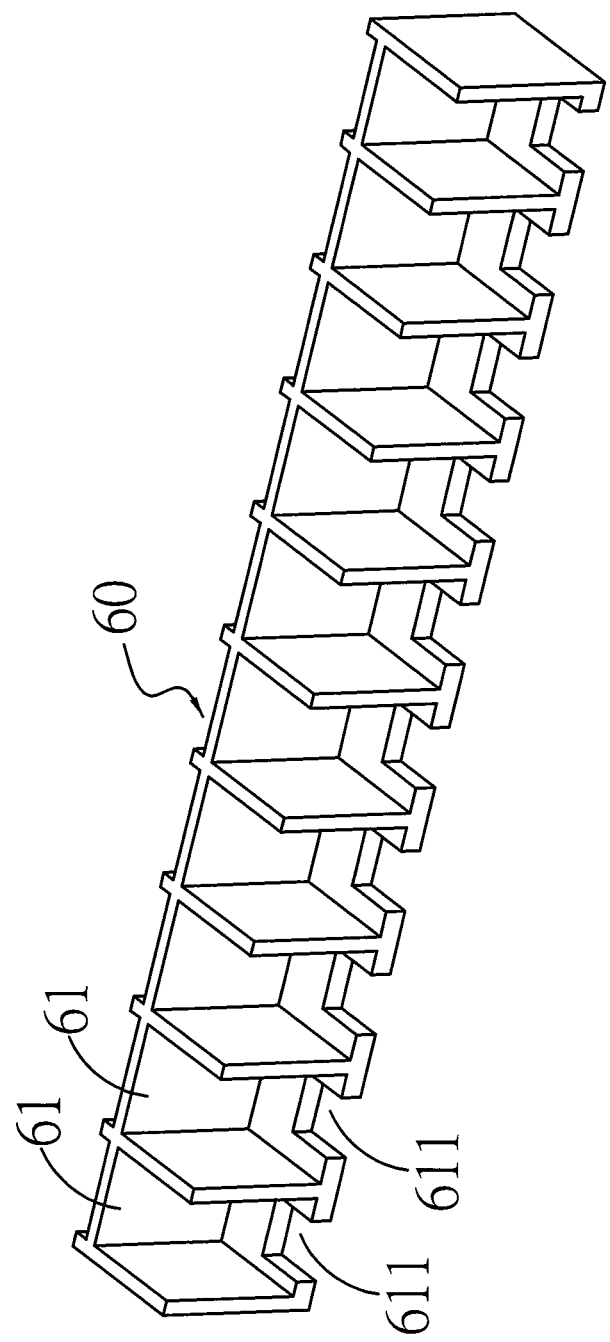
FIG. 6 is a schematic 3D view that shows a housing for raising seedling according to a third preferred embodiment of the invention.
Figure 7:
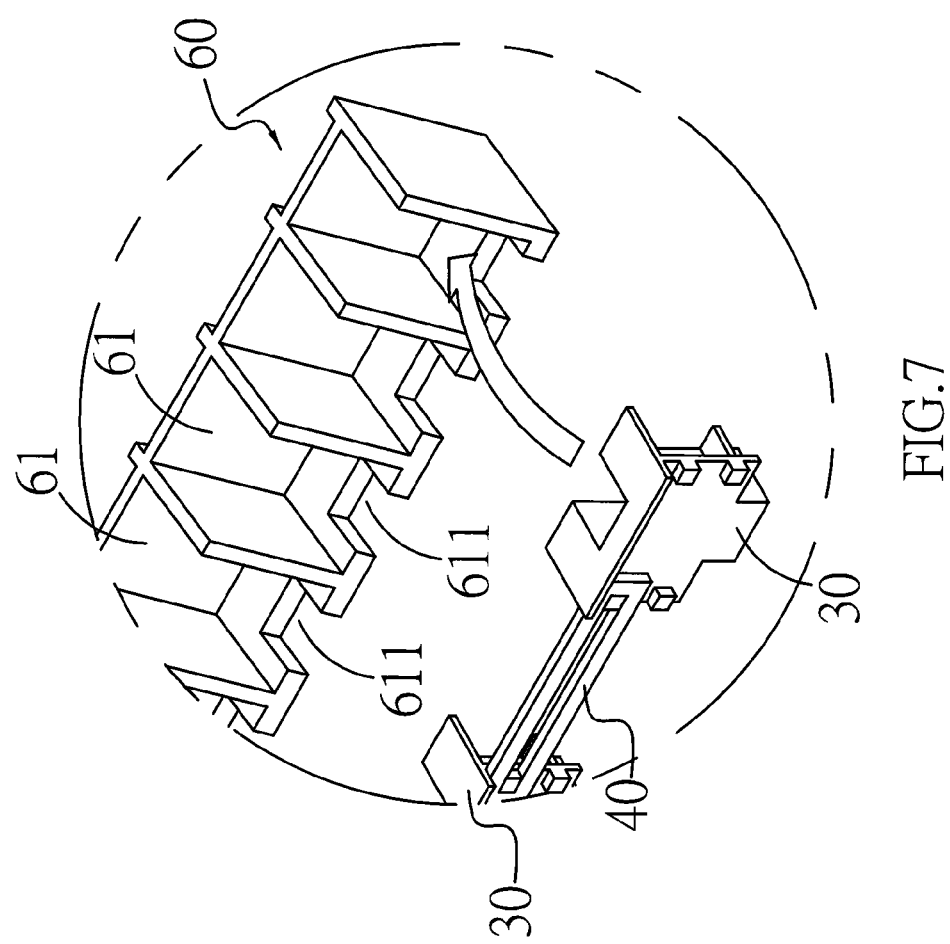
FIG. 7 is a schematic view that shows a ready-for-assembly structure of the individual container and the housing according to the third preferred embodiment of the invention.
Figure 8:
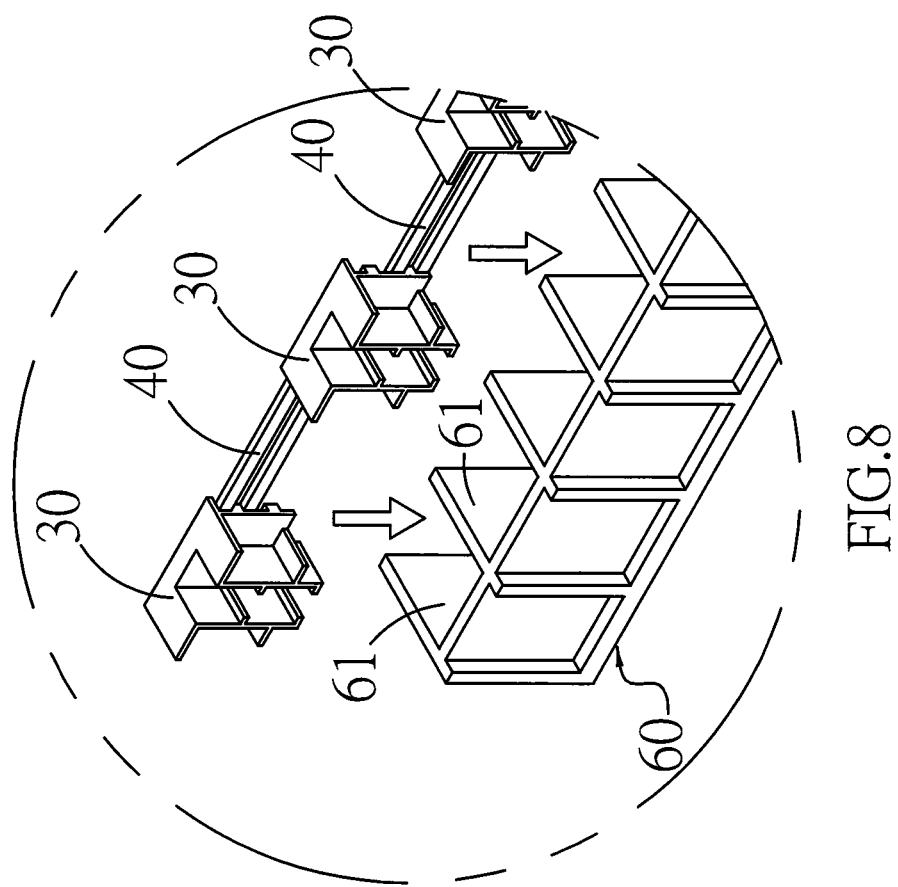
FIG. 8 is a schematic view that shows another ready-for-assembly structure of the individual container and the housing according to the third preferred embodiment of the invention.

Refer from FIG. 6 to FIG. 8, the modular device for raising seedling according to the invention further comprises at least a housing 60. Each housing 60 has a plurality of second chambers 61 to separate or partition each of the plurality of individual containers 30 so that each individual container can be inserted into each second chamber, respectively. Each second chamber 61 has an outlet 611 disposed on its bottom. Each second chamber 61 has its own opening which is located on the top side and the front side of the housing so as to allow the individual container to access to the opening. The afore-mentioned structure further provides an opening at a front position of the individual container 30 so that the first chamber 31 can access to the culture medium 20, such as foaming material. During operation, each individual container 30 can insert into the second chamber 61 via either a front side of the housing 60 (shown in FIG. 7) or a top side of the housing 60 (shown in FIG. 8). Therefore, the individual container 30 can obtain secure, reliable and shielding effects under the functioning of the housing 60.

Figure 9:
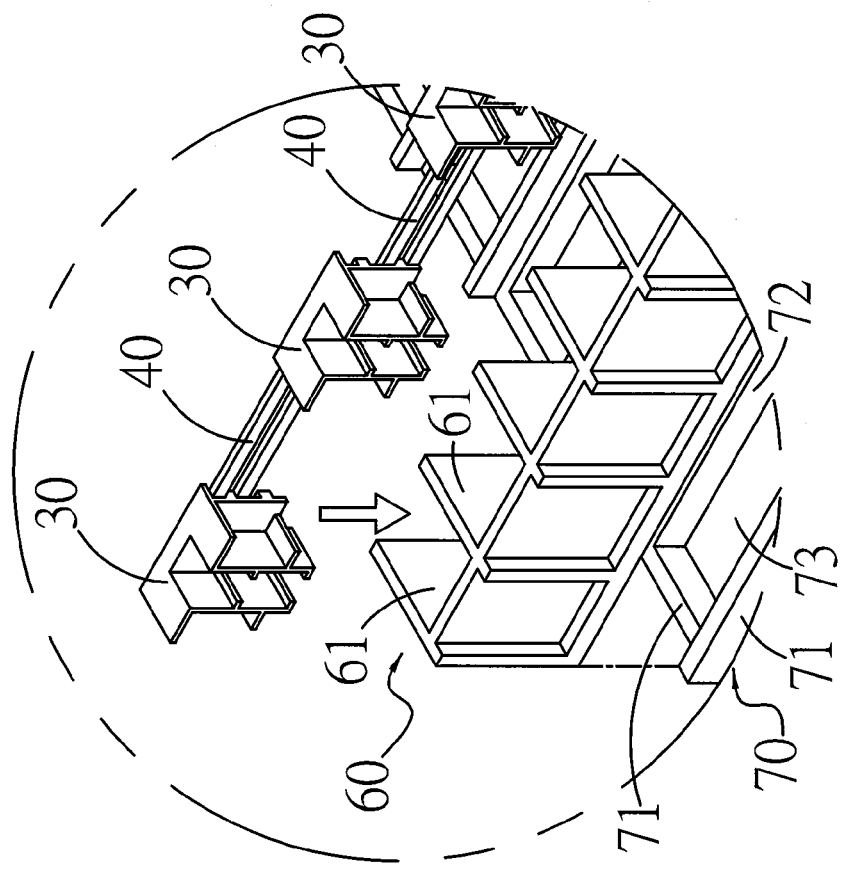
FIG. 9 is a schematic view that shows a modular device for raising seedling according to a fourth preferred embodiment of the invention.
Figure 10:
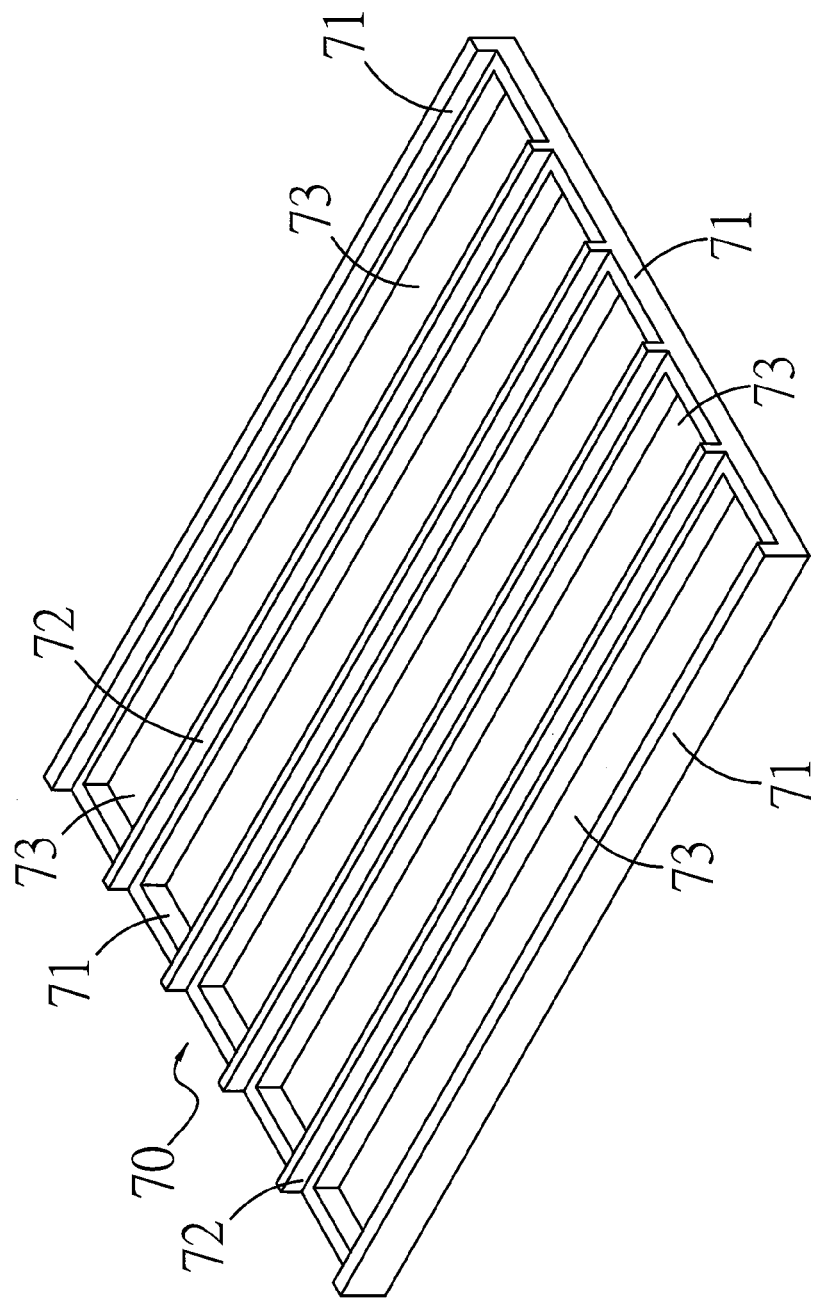
FIG. 10 is a schematic 3D view that shows a second frame according to the fourth preferred embodiment of the invention.

Refer to FIG. 9 and FIG. 10, the modular device for raising seedling according to the invention further comprises at least a housing 60 and a second frame 70. Similarly, each housing 60 has a plurality of second chambers 61 to separate or partition each of the plurality of individual containers 30 so that each individual container can be inserted into each second chamber, respectively. Each second chamber 61 has an outlet 611 disposed on its bottom. Each second chamber 61 has its own opening which is located on the top side and the front side of the housing so as to allow the individual container to access to the opening.

Besides, the second frame 70 is a rectangular frame formed of four surrounding sidebars 71, and two of the opposing sidebars are linked with at least a partition bar 72. The whole second frame 70 is partitioned by one or more than one partition bars 72 such that at least two grid cells 73 can be reserved exactly for receiving the housing 60. The predetermined number of individual containers 30 together with the housing 60 can be assembled or integrated as a moveable and/or manageable module under the functioning of the second frame 70. Furthermore, each first chamber 31 of the individual container 30 has its own opening formed on a front position of the individual container 30 so as to allow the culture medium 20 to access under the afore-mentioned structure.

Figure 11:
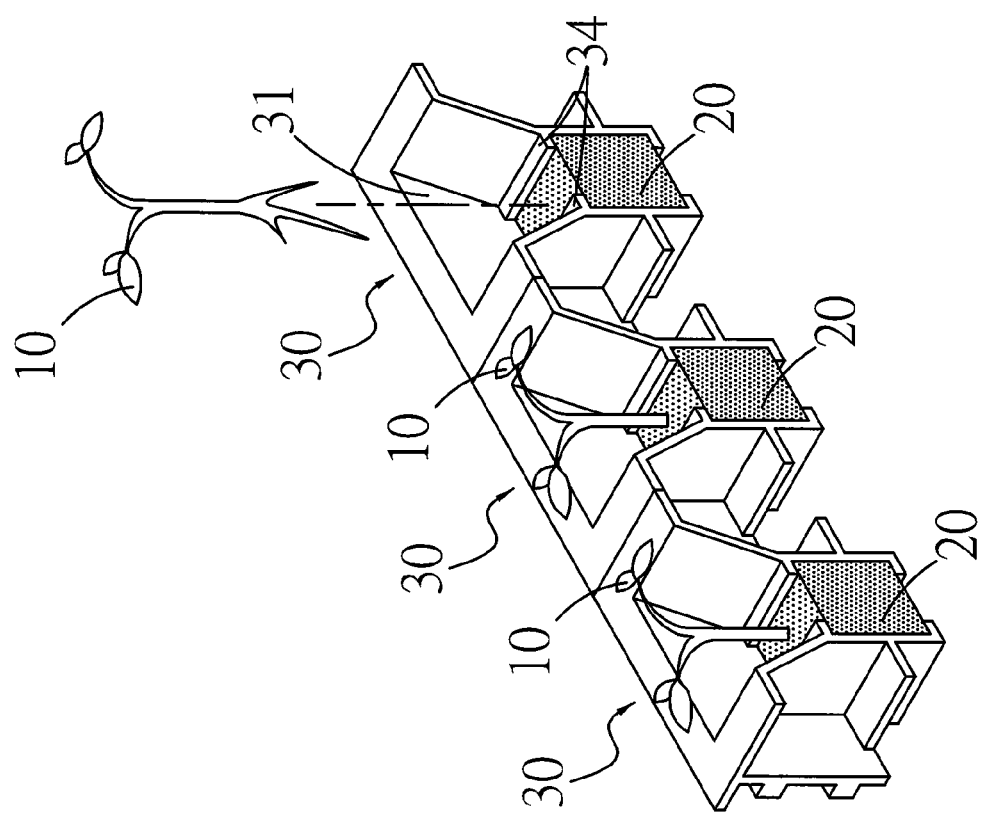
FIG. 11 is a schematic 3D view that shows a front side structure of an individual container according to another preferred embodiment of the invention.

Moreover, no matter what the modular device for raising seedling according to the invention includes the first frame or the second frame, the individual container 30 can be shown in FIG. 11. The first chamber 31 has an inner wall with at least a protrusion 34 to restrain the culture medium 20 from escaping so as to enhance secure/fixing effect on the culture medium 20, for example, escape of the culture medium 20 can be prevented while pulling up the seedling 10. Refer back to FIG. 11, each of the individual containers 30 has an inner wall in its own first chamber 31, and the inner wall has two opposing surfaces over the protrusion 34 in an upward and outward tilting arrangement so as to increase convenience of managing seedlings, under the mechanism of protrusion 34 to restrain the culture medium 20 from escaping.

Figure 12:
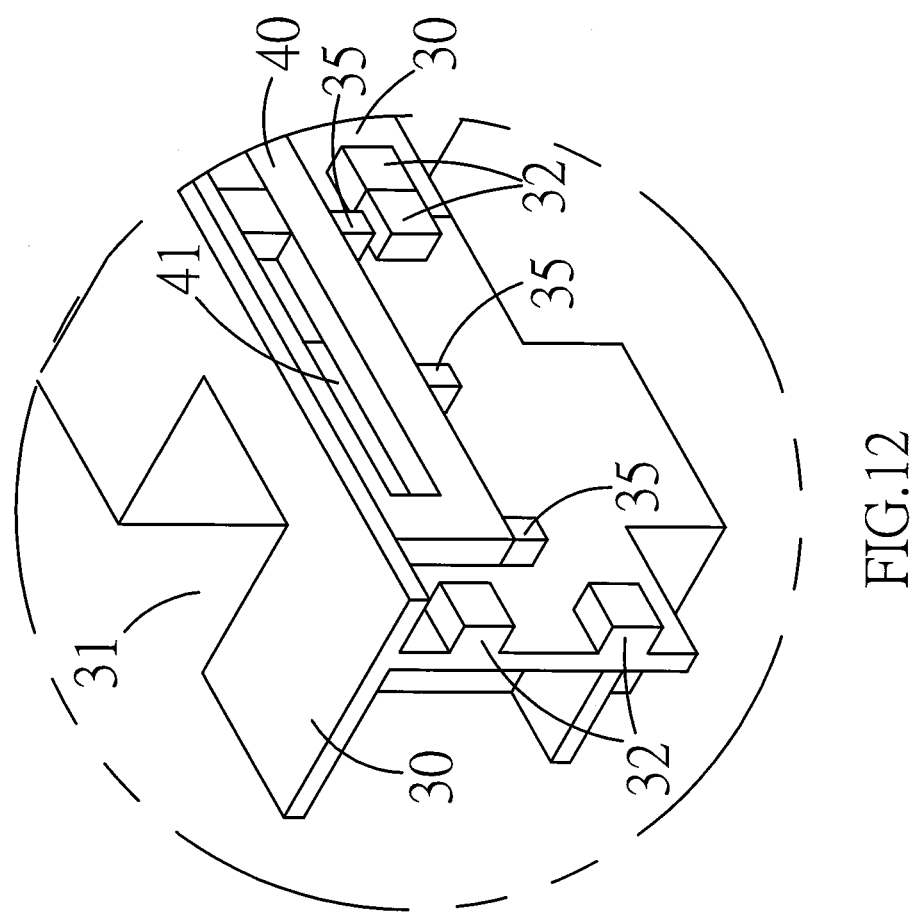
FIG. 12 is a schematic 3D view that shows a back-side structure of an individual container according to yet another preferred embodiment of the invention.

Besides, the individual container 30 is shown in FIG. 12. The individual container 30 is provided with at least an abutting bump 35 on its backside, and the abutting bump 35 is located below the coupling bump 40 along abutting edges. The mating groove 41 of the coupling bump 40 can be abutted to be wider mainly by the coupling bumps 32 when the abutting bump 35 is abutting against the mating groove 41, so as to ensure that the individual container 30 is secured and fixed at a right position. During practicing, each of the individual containers 30 has the inner wall in its own first chamber 31, and the inner wall has at least a protrusion 34 to restrain the culture medium 20 from escaping, and the two opposing surfaces are located over the protrusion 34 and arranged in an upward and outward tilting configuration. Besides, it is preferable that each of the individual containers 30 has at least a butting bump 35 on its backside for abutting against the coupling member.

Compared to the traditional solutions or structures of raising seedling, the present invention can obtain the following functions and effects:

1. The predetermined number of individual containers for assembly can be implemented based on the actual scale of cultivation.
2. The number of individual containers can be timely increased or decreased.
3. The distance between the adjacent individual containers can be adjustable so as to achieve the purpose of timely controlling the growth space of ground parts of plants based on the growth requirement of the cultivated plants.
4. The individual container can obtain secure, reliable and shielding effects substantially under the functioning of the housing.
5. The predetermined number of individual containers can be assembled or integrated as a moveable and/or manageable module substantially under the functioning of the first frame or the second frame.

Although a preferred embodiment of the invention has been described for purposes of illustration, it is understood that various changes and modifications to the described embodiment can be carried out without departing from the scope and the spirit of the invention as disclosed in the following appended claims.

What is claimed is:
1. A modular device for raising seedling, comprising:
   at least two individual containers, each of said individual containers having a first chamber recessed downwardly from a top side of said individual container so as to allow said first chamber to receive a culture medium and a seedling, said first chamber having a bottom provided with an outlet disposed thereon, said each individual container being provided with at least a pair of coupling bumps arranged on two opposing positions respectively on both lateral edges thereof and protruded at a predetermined height from a backside thereof; and at least a coupling member, formed in a longitudinal shape with a predetermined length, being provided with a mating groove arranged in extending around said longitudinal shape wherein said mating groove has a gap between its two inner longitudinal edges so as to allow said coupling bump to mate with, said mating groove having a distance between its two inner longitudinal edges thereof wherein the distance is greater than at least twice the width of said coupling bump, said mating groove being configured to allow said coupling bump of said each individual container to longitudinally slide within said mating groove after a serial connection of said adjacent containers, to thereby allow a spacing interval between said adjacent containers to be adjustable.

2. The modular device of claim 1, further comprising a first frame which is a rectangular frame formed of four surrounding sidebars, wherein one pair of said two opposing sidebars provides a gap therebetween to receive a plurality of said individual containers linked by said coupling member and wherein another pair of said two opposing sidebars is linked with at least a rib, each of said individual containers having a bottom provided with a concave respectively disposed on each of two sides of said bottom so as to allow said sidebars and rib to extend therethrough.

3. The modular device of claim 1, further comprising a first frame which is a rectangular frame formed of four surrounding sidebars, wherein one pair of said two opposing sidebars provides a gap therebetween to receive a plurality of said individual containers linked by said coupling member and wherein another pair of said two opposing sidebars is linked with at least a rib, at least a partition bar being disposed to connect vertically with each rib and said two opposing sidebars, and each of said individual containers having a concave respectively disposed on each of two sides of its bottom so as to allow said sidebars and rib to extend therethrough.

4. The modular device of claim 1, further comprising at least a housing, wherein said each housing has a plurality of second chambers to separate each of said plurality of individual containers respectively inserting into each of said second chambers, said each second chamber having a bottom provided with an outlet, each of said second chambers having an opening disposed on a top side and a front side of said housing respectively so as to allow said individual container to access; an opening being provided at a front position of said individual container so as to allow its first chamber to access to said culture medium.

5. The modular device of claim 1, further comprising at least a housing and a second frame; wherein said each housing has a plurality of second chambers to separate each of said plurality of individual containers respectively inserting into each of said second chambers, said each second chamber having a bottom provided with an outlet, each of said second chambers having an opening disposed on a top side and a front side of said housing respectively so as to allow said individual containers to access; said second frame being a rectangular frame formed of four surrounding sidebars wherein two of said opposing sidebars are linked with at least a partition bar, said second frame being partitioned by said at least a partition bar so as to reserve at least two grid cells for receiving said housing; and said first chamber of said each individual container having an opening formed on a front position of said each individual container so as to allow said culture medium to access.

6. The modular device of claim 1, wherein said each individual container is provided with at least a pair of coupling bumps on two opposing positions respectively on both lateral edges thereof and protruded at a predetermined height from a backside thereof; two of said coupling bumps on the same lateral edge having a distance that is arranged to allow an interleaving movement of two of said coupling members.

7. The modular device of claim 1, wherein said first chamber of said each individual container has an inner wall provided with at least a protrusion to restrain said culture medium from escaping.

8. The modular device of claim 1, wherein said first chamber of said each individual container has an inner wall provided with at least a protrusion to restrain said culture medium from escaping, and said inner wall has two opposing surfaces over said protrusion in an upward and outward tilting arrangement.

9. The modular device of claim 1, wherein said pair of coupling bumps on two opposing positions of said each individual container is provided with at least an abutting bump therebetween for abutting against said coupling member along abutting edges.

10. The modular device of claim 1, wherein said first chamber of said each individual container has an inner wall provided with at least a protrusion to restrain said culture medium from escaping, and said inner wall has two opposing surfaces over said protrusion configured in a upward and outward tilting arrangement; and wherein said pair of coupling bumps on two opposing positions of said each individual container is provided with at least an abutting bump therebetween for abutting against said coupling member along abutting edges.

* * * * *